J. WHITESIDE.
Fence.
No. 58,013.
Patented Sept. 11, 1866.
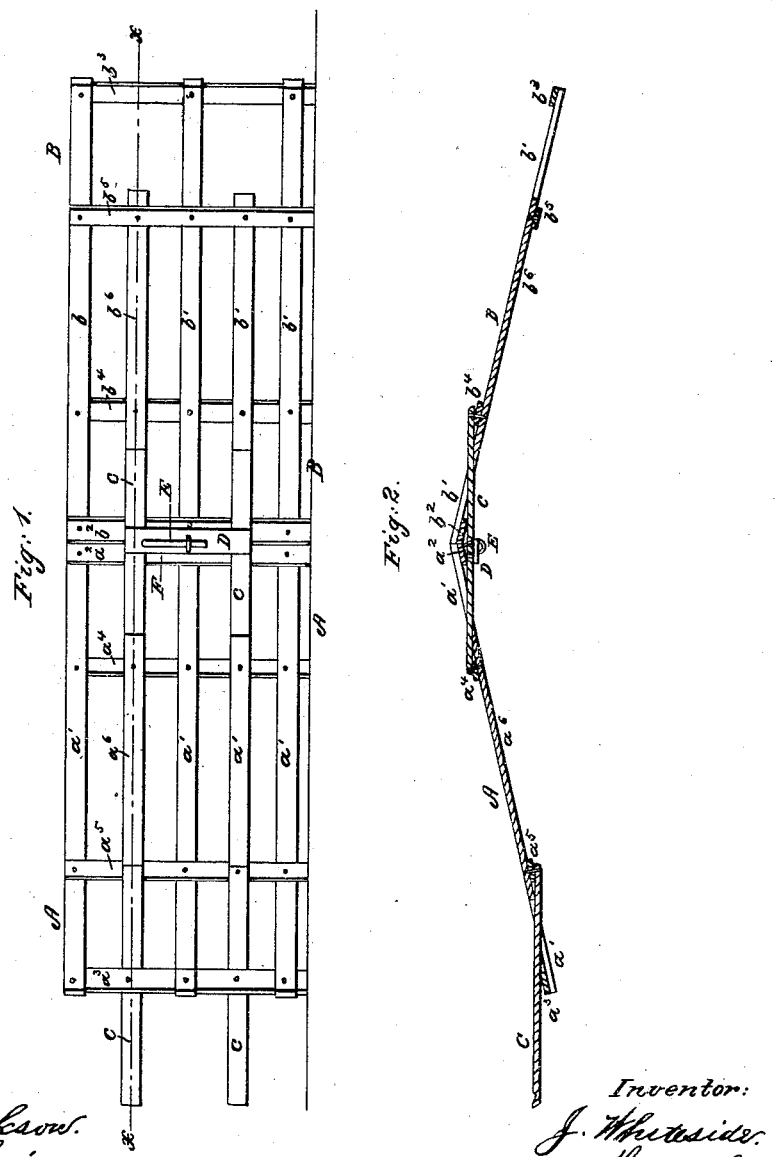

UNITED STATES PATENT OFFICE.

J. WHITESIDE, OF COESSE, INDIANA.

IMPROVEMENT IN FENCES.

Specification forming part of Letters Patent No. 58,013, dated September 11, 1866.

*To all whom it may concern:*

Be it known that I, JEREMIAH WHITESIDE, of Coesse, Whitley county, and State of Indiana, have invented a new and useful Improvement in Portable Field-Fences; and I do hereby declare that the following is a full, clear, and exact description thereof, which will enable others skilled in the art to make and use the same, reference being had to the accompanying drawings, forming part of this specification, in which—

Figure 1 is a side view of a portion of my improved fence. Fig. 2 is a horizontal section of the same taken through the line $x\ x$, Fig. 1.

Similar letters of reference indicate like parts.

My invention has for its object to furnish an improved fence strong and substantial without its being necessary to set posts in the ground, which shall be so constructed that the timber will have no chance to warp or twist, and which shall be so bound together that there will be no strain upon the nails; and it consists of an improved fence constructed and arranged as hereinafter more fully described.

A and B are two adjacent panels of the fence. $a$ and $b$ are the long horizontal bars of the panels. To these bars, at their ends and on opposite sides, are nailed the end uprights $a^2\ a^3$ and $b^2\ b^3$.

$a^4\ a^5$ and $b^4\ b^5$ are uprights nailed to the bars $a'$ and $b'$, at a distance from their ends depending upon the angle which it is desired that the adjacent panels should form with each other. The more obtuse it is desired that this angle should be, the farther from the ends of the panels the said bars should be placed.

C are the binding-bars, which are attached to the uprights of one of the panels—as, for example, to the uprights $b^2$ and $b^4$ of the panel B—and they interlock with the uprights $a^2$ and $a^4$ of the adjacent panel, as shown in Figs. 1 and 2. The ends of these binding-bars C are notched to make them fit closer to the uprights $a^4$ and $b^4$, as shown in Fig. 2.

D is a strip, the ends of which are attached to the upper and lower binding-bars C, as seen in Fig. 1. Through the strip D is formed a hole through which passes a staple, E, attached to the end upright $a^2$ of the panel A—that is to say, of the panel to which the binding-bars C are not nailed.

F is a tapering key, which is passed through the projecting loop of the staple E, and holds the two panels securely bound together. The other panels of the fence are secured to each other in the same way. For a cattle-fence this will be sufficient; but for a fence designed to stop smaller animals the short horizontal bars $a^6$ may be nailed to the uprights $a^4$ and $a^5$, and the bars $b^6$ to the uprights $b^4$ and $b^5$, in a line with the binding-bars C, as shown in Fig. 1.

It should be observed that the uprights should extend down a little below the lower edge of the lowest horizontal bars for the fence to stand upon, as shown in Fig. 1.

I claim as new and desire to secure by Letters Patent—

An improved portable field-fence, constructed and arranged substantially as herein described, and for the purposes set forth.

JER. WHITESIDE.

Witnesses:
WILLIAM DEPOY,
LEONARD AKER.